United States Patent
Yang et al.

(10) Patent No.: US 12,049,026 B2
(45) Date of Patent: Jul. 30, 2024

(54) METHOD OF REINFORCEMENT FOR KERATIN MATERIALS

(71) Applicant: NUtech Ventures, Lincoln, NE (US)

(72) Inventors: Yiqi Yang, Lincoln, NE (US); Bingnan Mu, Lincoln, NE (US)

(73) Assignee: NUtech Ventures, Lincoln, NE (US)

( * ) Notice: Subject to any disclaimer, the term of this patent is extended or adjusted under 35 U.S.C. 154(b) by 99 days.

(21) Appl. No.: 17/478,279

(22) Filed: Sep. 17, 2021

(65) Prior Publication Data

US 2022/0080628 A1    Mar. 17, 2022

Related U.S. Application Data

(60) Provisional application No. 63/080,016, filed on Sep. 17, 2020.

(51) Int. Cl.
| | |
|---|---|
| C08L 89/04 | (2006.01) |
| B29C 39/00 | (2006.01) |
| B29C 39/38 | (2006.01) |
| C08B 37/08 | (2006.01) |
| C08K 5/37 | (2006.01) |
| B29K 105/00 | (2006.01) |

(52) U.S. Cl.
CPC ............ B29C 39/003 (2013.01); B29C 39/38 (2013.01); C08B 37/003 (2013.01); C08K 5/37 (2013.01); C08L 89/04 (2013.01); B29K 2005/00 (2013.01); B29K 2089/00 (2013.01); B29K 2105/251 (2013.01); B29K 2995/0097 (2013.01); C08K 2201/005 (2013.01); C08K 2201/011 (2013.01); C08L 2201/54 (2013.01); C08L 2203/12 (2013.01)

(58) Field of Classification Search
CPC ..... B29C 39/003; B29C 39/38; C08B 37/003; C08K 5/37; C08L 89/04
See application file for complete search history.

(56) References Cited

U.S. PATENT DOCUMENTS

| | | | | |
|---|---|---|---|---|
| 5,891,199 A | * | 4/1999 | Wachter | A61K 8/736 8/405 |
| 2003/0064089 A1 | * | 4/2003 | Kumar | C12N 5/0068 514/16.5 |
| 2003/0108488 A1 | * | 6/2003 | Rajaiah | A61K 6/35 523/120 |
| 2004/0110722 A1 | * | 6/2004 | Ornberg | A61L 27/20 536/53 |
| 2004/0116332 A1 | * | 6/2004 | Ornberg | C08B 15/00 536/53 |
| 2005/0171250 A1 | * | 8/2005 | Hayes | B32B 27/36 524/445 |

(Continued)

OTHER PUBLICATIONS

An et al., "Biofuel and petroleum-based fuel supply chain research: A literature review," Biomass and Bioenergy, Oct. 2011, 35(9):3763-3774.

(Continued)

Primary Examiner — Andrew D Graham
(74) Attorney, Agent, or Firm — Fish & Richardson P.C.

(57) ABSTRACT

A method for preparing keratin-based composites includes mixing polysaccharide nanoparticles and a keratin solution to form a nanoparticle-keratin solution; and solvent casting the nanoparticle-keratin solution to form the keratin-based composites.

32 Claims, 5 Drawing Sheets

(56) References Cited

U.S. PATENT DOCUMENTS

| | | | | |
|---|---|---|---|---|
| 2006/0178339 | A1* | 8/2006 | Abe | A61L 31/042 536/18.7 |
| 2006/0241287 | A1* | 10/2006 | Hecht | C08B 37/0003 530/356 |
| 2008/0105998 | A1* | 5/2008 | Woerdeman | C08L 89/00 264/239 |
| 2010/0114348 | A1* | 5/2010 | Boyden | G16H 50/50 700/109 |
| 2010/0210745 | A1* | 8/2010 | McDaniel | C09D 7/48 521/55 |
| 2010/0323930 | A1* | 12/2010 | Champ | C08B 1/003 507/214 |
| 2012/0089232 | A1* | 4/2012 | Choi | A61K 9/143 977/773 |
| 2012/0104656 | A1* | 5/2012 | Kelly | C08J 3/24 264/319 |
| 2012/0149808 | A1* | 6/2012 | Hajek | C08L 33/08 524/704 |
| 2012/0156389 | A1* | 6/2012 | Kotov | B82Y 40/00 427/415 |
| 2012/0164207 | A1* | 6/2012 | Gooberman | A61P 25/32 514/476 |
| 2012/0329916 | A1* | 12/2012 | Hergenrother | C08L 9/06 524/21 |
| 2013/0216592 | A1* | 8/2013 | Delair | A61K 47/36 514/777 |
| 2013/0282138 | A1* | 10/2013 | Mckay | A61B 17/7062 623/23.61 |
| 2014/0008264 | A1* | 1/2014 | Efstathiou | C08J 5/18 106/125.1 |
| 2014/0051780 | A1* | 2/2014 | Gross | C08G 63/08 521/182 |
| 2014/0060383 | A1* | 3/2014 | Wu | C08L 89/04 106/156.5 |
| 2015/0368308 | A1* | 12/2015 | Ng | C07K 14/4741 530/357 |
| 2020/0197559 | A1* | 6/2020 | Bourdillon | A61L 15/225 |
| 2020/0407468 | A1* | 12/2020 | Bianchini | A61K 47/34 |
| 2021/0269554 | A1* | 9/2021 | Saleh | C08L 89/04 |
| 2021/0340587 | A1* | 11/2021 | Ibrahim | C12P 13/04 |

OTHER PUBLICATIONS

Arola et al., "Binding of cellulose binding modules reveal differences between cellulose substrates," Scientific Reports, Oct. 17, 2016, 6:35358, 9 pages.

Bajwa et al. "Characterization of bio-carbon and ligno-cellulosic fiber reinforced bio-composites with compatibilizer," Construction and Building Materials, Apr. 20, 2019, 204:193-202.

Barra et al., "Eco-friendly preparation of electrically conductive chitosan - reduced graphene oxide flexible bionanocomposites for food packaging and biological applications," Composites Science and Technology, Mar. 2019, 173:53-60.

Bayati et al., "Diffusion Behavior of Water at Infinite Dilution in Hydroxypropyl Xylan Films with Sorbitol and Cellulose Nanocrystals," ACS Sustainable Chemistry & Engineering, Mar. 26, 2014, 2(5):1305-1311.

Biology of the Integument, Bereiter-Hahn et al. (ed.), 1986, Chapter 33, pp. 666-694.

Changrong et al., "Plastic-film mulch in Chinese agriculture: Importance and problems," World Agriculture, Jan. 2014, 4(2):32-36.

Chen et al., "Molecular modeling of cellulose in amorphous state. Part I: modelbuilding and plastic deformation study," Polymer, 2004, 45:1063-1071.

Chen et al., "Proteomic Analysis of Polysaccharide-Milk Protein Interactions Induced by Chitosan," Molecules, Apr. 28, 2015, 20(5): 7737-7749.

Dash et al., "Improving the mechanical and thermal properties of gelatin hydrogels cross-linked by cellulose nanowhiskers," Carbohydrate Polymers, Jan. 16, 2013, 91(2):638-645.

Einbu & Vårum, "Characterization of Chitin and Its Hydrolysis to GlcNAc andGlcN," Biomacromolecules, 2008, 9:1870-1875.

EPA.gov [online], "Facts and Figures about Materials, Waste and Recycling," Jul. 2021, retrieved on Jun. 10, 2022, retrieved from URL<https://www.epa.gov/facts-and-figures-about-materials-waste-and- recycling>, 4 pages.

EPA.gov [online], National Overview: Facts and Figures on Materials, Wastes and Recycling, Jul. 2021, retrieved on Jun. 10, 2022, retrieved from URL<https://www.epa.gov/facts-and-figures-about-materials-waste-and-recycling/national-overview-facts-and-figures-materials>, 17 pages.

Fortunati et al., "Multifunctional bionanocomposite films of poly(lactic acid), cellulose nanocrystals and silver nanoparticles," Carbohydrate Polymers, Jan. 15, 2012, 87(2):1596-1605.

Gopalakrishna et al., "Biocomposites from Biofibers and Biopolymers,"Biofibers and Biopolymers for Biocomposites, Mar. 2020, pp. 91-110.

Hao et al., "Kenaf/polypropylene nonwoven composites: The influence of manufacturing conditions on mechanical, thermal, and acoustical performance," Composites Part B: Engineering, Nov. 2013, 54:44-51.

Huang et al., "Optimization of flexible multilayered metastructure fabricated by dielectric-magnetic nano lossy composites with broadband microwave absorption," Composites Science and Technology, May 2020, 191:108066.

Jiang et al., "The effect of non-covalent interaction of chlorogenic acid with whey protein and casein on physicochemical and radical-scavenging activity of in vitro protein digests," Food Chemistry, Dec. 2018, 268:334-341.

Jun et al., "Stretchable photodetector utilizing the change in capacitance formed in a composite film containing semiconductor particles," Composites Science and Technology, Sep. 2019, 182:107773, 7 pages.

Kim et al., "Anisotropic optical film embedded with cellulose nanowhisker," Carbohydrate Polymers, Oct. 5, 2015, 130:448-454.

Li et al., "Full-degradable composites reinforced by the low temperature treated cotton fabrics with enhanced strength and interfacial bonding," Composites Part B: Engineering, Nov. 2019, 177:107269, 9 pages.

Li et al., "Urea-cysteine based extraction of densely crosslinked protein from sorghum distillers grains with high yield and quality," Industrial crops and products, Oct. 2018, 121:360-371.

Martelli et al., "Mechanical properties, water vapor permeability and water affinity of feather keratin films plasticized with sorbitol," Journal of Polymers and the Environment, Jul. 8, 2006, 14(3):215-222.

Matthews et al., "The Weight of Nations: Material Outflows from Industrial Economies," World Resources Institute, 2000, 135 pages.

Mi et al., "From Poultry Wastes to Quality Protein Products via Restoration of the Secondary Structure with Extended Disulfide Linkages," ACS Sustainable Chemistry & Engineering, Jan. 10, 2020, 8(3):1396-1405.

Mi et al., "Submicron amino acid particles reinforced 100% keratin biomedical films with enhanced wet properties via interfacial strengthening," Colloids and Surfaces B: Biointerfaces, May 2019, 177:33-40.

Mi et al., "Valorization of keratin from food wastes via crosslinking using non-toxic oligosaccharide derivatives," Food Chemistry, Dec. 2019, 300: 125181, 25 pages.

Moore et al., "Influence of the glycerol concentration on some physical properties of feather keratin films," Food Hydrocolloids, Oct. 2006, 20(7):975-982.

Mu et al., "A water/cottonseed oil bath with controllable dye sorption for high dyeing quality and minimum discharges," Journal of Cleaner Production, Nov. 2019, 236:117566.

Mu et al., "Accelerated hydrolysis of substituted cellulose for potential biofuel production: Kinetic study and modeling," Bioresource Technology, Nov. 2015, 196:332-338.

Mu et al., "Controlled assembly of secondary keratin structures for continuous and scalable production of tough fibers from chicken feathers," Green Chemistry, Feb. 18, 2020, 22(5):1726-1734.

(56) References Cited

OTHER PUBLICATIONS

Mu et al., "Ductile keratin/deacetylated chitin composites with nanoparticle-induced formation of ordered and entangled structures," Composites Science and Technology, 2020, 200:108462-108469, 7 pages.

Mu et al., "Freeze-extrusion for controllable assembly of 3-dimensional ultra-fine and amorphous fibrous matrices: potential applications in sorption," Journal of Materials Chemistry A, Apr. 27, 2018, 6(22): 10320-10330.

Mu et al., Quantitation of fast hydrolysis of cellulose catalyzed by its substituents for potential biomass conversion, Bioresource Technology, Feb. 2019, 273:305-312.

Nishino et al., "Elastic modulus of the crystalline regions of chitin and chitosan," J Polym Sci B: Polym Phys, 1999, 37:1191-1196.

Okonko et al., "Utilization of food wastes for sustainable development," Electronic Journal of Environmental, Agricultural and Food Chemistry, Jan. 2009, 8(4):263-286, 25 pages.

Shen et al., "Shape-stabilized hydrated salt/paraffin composite phase change materials for advanced thermal energy storage and management," Chemical Engineering Journal, Apr. 2020, 385:123958, 8 pages.

Shinya et al., "The first identification of carbohydrate binding modules specific to chitosan," Journal of Biological Chemistry, Oct. 18, 2013, 288(42):30042-30053.

Tanaka and Iwata, "Estimation of the Elastic Modulus of Cellulose Crystal by Molecular Mechanics Simulation," Cellulose, 2006, 13:509-517.

Unep, "Decoupling natural resource use and environmental impacts from economic growth, A Report of the Working Group on Decoupling to the International Resource Panel," UNEP, 2011, 174 pages.

Wirth, "European Communities—Measures Affecting Asbestos and Asbestos-Containing Products," American Journal of International Law, Apr. 2002, 96(2):435-439.

Zhao et al., "Can More Nanoparticles Induce Larger Viscosities of Nanoparticle-Enhanced Wormlike Micellar System (NEWMS)?," Materials, Sep. 18, 2017, 10(9):1096, 11 pages.

Zhao et al., "Modified soy protein to substitute non-degradable petrochemicals for slashing industry," Industrial Crops and Products, May 2015, 67:466-474.

\* cited by examiner

METHOD OF REINFORCEMENT FOR KERATIN MATERIALS

RELATED APPLICATIONS

This application claims the benefit of U.S. Provisional Application No. 63/080,016, filed Sep. 17, 2020, which is incorporated herein by reference in its entirety.

GOVERNMENT SUPPORT

This invention was made with government support under 2019-67021-29940 awarded by the United States Department of Agriculture, National Institute of Food and Agriculture (USDA-NIFA). The government has certain rights in the invention.

TECHNICAL FIELD

The present disclosure relates to reinforcement for keratin materials using compatible and chemically coupled natural polysaccharides with amino groups, carboxyl groups, derivatives thereof, or combinations thereof to increase the elongation as well as breaking strength and modulus of keratin-based materials. Such reinforcements not only induce the formation of keratin structures but also control the alignment of protein chains. As a result, breaking strain and breaking stress of composites can be remarkably improved.

BACKGROUND

Biodegradability and sustainability are important for the composite industry. Non-degradable products have been used for decades in agricultural and textile industries and made tremendous contributions. However, unsustainability and severe environmental impact are two major concerns for these industries. Meanwhile, partially and fully bio-based composites have been developed for various applications such as food packaging, thermal isolation, microwave adsorption, sound adsorption, semi-conduction, and others. Still, there are plenty of areas suffering from unsustainable and non-environmental development and in need of sustainable alternatives. For example, mulch is essential in the agricultural industry since it can maintain the temperature, improve the efficiency of water utilization, and mitigate the dry soil. For a long time, petroleum-based films were used as mulch. However, such mulch has resulted in problems such as environmental pollution, microplastic formation, and toxic additives. More critical, removing or recycling such mulch is very difficult.

Biodegradable films with desirable mechanical properties, wet stabilities, and other required properties are in need of replacing undegradable mulch. Sizing, the process of applying a protective adhesive coating upon a yarns surface, is one of the most important parts in yarn manufacturing. Due to the high weaving efficiency of the fabric, polyvinyl alcohol is the best sizing agent. However, poor biodegradability of petroleum-based polyvinyl alcohol resulted in high chemical oxygen demand (COD) in textile wastewater. Currently, PVA has been banned by European Union. Therefore, the global textile industry has recognized the need for biodegradable, low-cost sizing chemicals to replace PVA.

Keratinous materials are a candidate to substitute petroleum-based products. Keratinous wastes, especially poultry feathers, are abundant, safe, cost-effective, and readily available materials for various applications. Keratin materials from the butchery industry alone are annually generated at 10 million tons, 2.5 times higher than the current output of both wool and silk. Besides wide availability, keratinous materials have better performances due to the high degrees of crosslinking. However, inefficient re-construction of secondary structures and crosslinking bonds within interpolymeric chains, and poor molecular alignment prevent the regenerated keratin materials from having similar properties to the original materials. Therefore, there remains no continuous industrial application of keratinous wastes.

The addition of nano or submicron particles as reinforcements is a common approach to strengthen and stabilize protein materials. Cellulose nanocrystals are one of the most commonly used reinforcement materials. However, due to discrepancies in biocompatibility between the nanocrystals and keratin, improvement in the final properties of the protein matrix is limited. The development of full biocomposites still has a long way to go.

SUMMARY

Provided herein is a method for preparing keratin-based composites, including: (i) mixing polysaccharide nanoparticles and a keratin solution to form a nanoparticle-keratin solution; and (ii) solvent casting the nanoparticle-keratin solution to form the keratin-based composites.

In some embodiments, the concentration of nanoparticles in the nanoparticle-keratin solution is from about 1% to about 5%.

In some embodiments, the polysaccharide nanoparticles have an average particle size of about 80 nm to about 500 nm.

In some embodiments, the polysaccharide nanoparticles include natural polysaccharides comprising one or more hydroxyl groups, aldehyde groups, amino groups, carboxyl groups, or derivatives thereof. In some embodiments, the polysaccharide nanoparticles include chitin, sodium alginate, carboxymethyl cellulose, or combinations thereof. In some embodiments, the polysaccharide nanoparticles are chitin nanoparticles. In some embodiments, the chitin nanoparticles have a degree of deacetylation about 5% to about 60%.

In some embodiments, the chitin nanoparticles are prepared by a process including: treating chitin with an acid to form an acid hydrolyzed chitin; and treating the acid hydrolyzed chitin with an alkali solution.

In some embodiments, the acid includes hydrochloric acid, sulfuric acid, or a combination thereof. In some embodiments, the alkali solution includes sodium hydroxide, potassium hydroxide, or a combination thereof.

In some embodiments, the keratin solution has a concentration of from about 5% to about 15% keratin. In some embodiments, the keratin solution is an aqueous solution.

In some embodiments, the keratin solution includes a reducing agent. In some embodiments, the reducing agent includes one or more thiol groups. In some embodiments, the reducing agent includes mercaptoethanol, cysteine, dithiothreitol, 1,2-ethanedithiol, 1,3-benzenedithiol, bis(2-mercaptoethyl) ether, ethylene glycol bisthioglycolate, or a combination thereof.

In some embodiments, the keratin solution is prepared by a method including: extracting keratin from a keratinous material to form extracted keratin; and dissolving the extracted keratin in an aqueous solution comprising a reducing agent to form the keratin solution.

In some embodiments, the keratinous material includes animal hair, horn, feather, or a combination thereof. In some embodiments, the feather includes a duck feather, a goose feather, a chicken feather, or a combination thereof. In some embodiments, the animal hair includes wool, camel hair, alpaca hair, rabbit hair, or a combination thereof.

In some embodiments, the pH of the aqueous solution is maintained between pH 8 and pH 10.

In some embodiments, the n value of keratin in the nanoparticle-keratin solution is identical to or higher than the n value of the same keratin solution without the nanoparticles.

In some embodiments, the method further includes heating the keratin-based composites. In some embodiments, the composites are heated at a temperature of from about 45° C. to about 55° C. for a time of about 1.5 h to about 3 h.

In some embodiments, the thickness of the composites is from about 50 micrometers to about 200 micrometers.

In some embodiments, the composites are fibers having a diameter of about 15 micrometers.

In some embodiments, the composites include at least about 80% keratin.

In some embodiments, a degree of crystallinity of the composites is higher than the same composites without the nanoparticles.

In some embodiments, a breaking stress of the composites is higher than the same composites without the nanoparticles.

In some embodiments, a breaking strain of the composites is higher than the same composites without the nanoparticles.

In some embodiments, the composites have a breaking stress of about 15 MPa to about 40 MPa.

In some embodiments, the composites have a breaking strain of about 15% to about 50%. Also provided herein are keratin-based composites prepared by the method including: (i) mixing polysaccharide nanoparticles and a keratin solution to form a nanoparticle-keratin solution; and (ii) solvent casting the nanoparticle-keratin solution to form the keratin-based composites.

Unless otherwise defined, all technical and scientific terms used herein have the same meaning as commonly understood by one of ordinary skill in the art to which this invention belongs. Methods and materials are described herein for use in the present invention; other, suitable methods and materials known in the art can also be used. The materials, methods, and examples are illustrative only and not intended to be limiting. All publications, patent applications, patents, sequences, database entries, and other references mentioned herein are incorporated by reference in their entirety. In case of conflict, the present specification, including definitions, will control.

Other features and advantages of the invention will be apparent from the following detailed description and figures, and from the claims.

Figure 1:
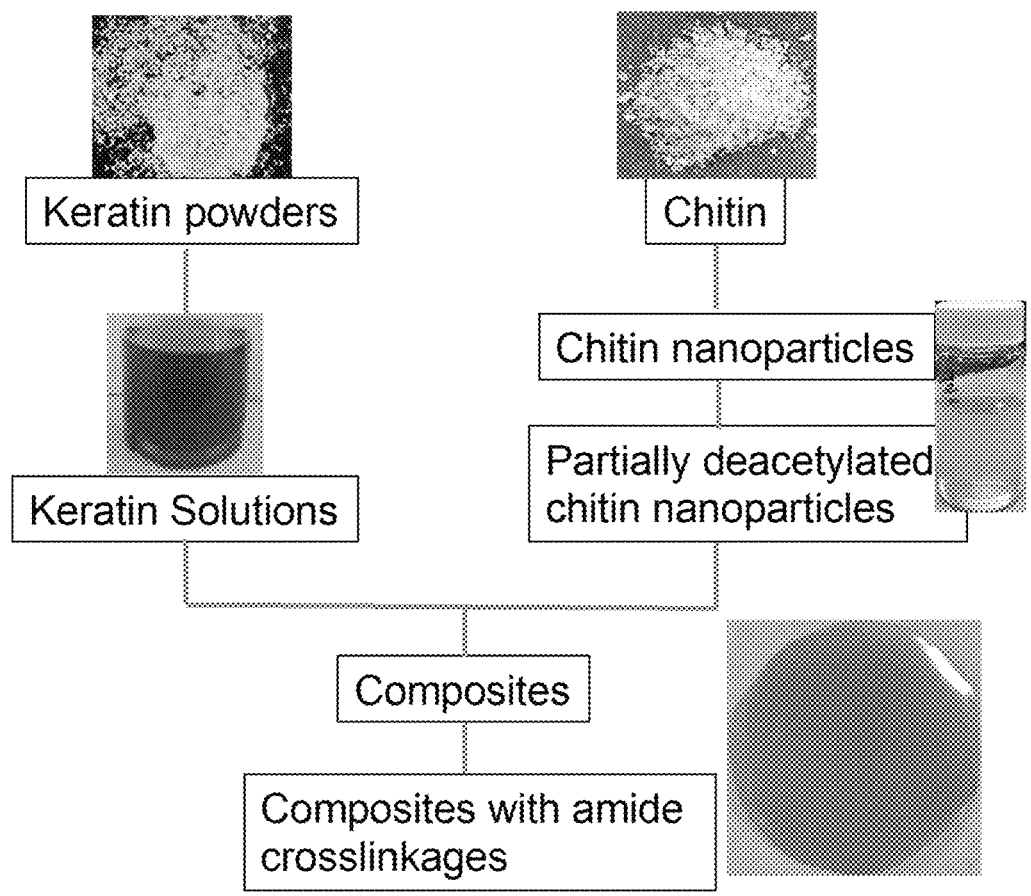
FIG. 1. is a diagram of development of partially-deacetylated-chitin-reinforced keratin-based composites.

Films were immersed in water with a pH of 5 for one week. 3 wt % of nanoparticles based on the weight of keratin were added. Data with the same letter indicate no statistically significant difference.

DETAILED DESCRIPTION

Provided in the present disclosure is a method for preparing tough keratin-based composites. The composites have enhanced elongation as well as increased strength and modulus. In some embodiments, the composites are prepared via a clean and cost-effective process. The composites of the present disclosure contain polysaccharide nanoparticles and keratin. In addition to standard features of nanoparticles such as large surface areas, accessible bonding sites, ordered shape, the nanoparticles of the present disclosure can have amino groups in their chemical structures rather than on the particle surface. As a result, in some embodiments, the keratin protein molecules can form crosslinkages with the amino groups of the nanoparticles, making the bonding between keratin and nanoparticles stronger. These crosslinkages increase the physical interaction between the nanoparticles and keratin, resulting in an increased degree of entanglement in solution and the formation of ordered keratin structures with improved alignment of molecular chains. Moreover, due to the high amount of amino groups in nanoparticles, one nanoparticle could interact with multiple protein chains, making it possible to increase the length of molecular chains in composites substantially.

In some embodiments, the polysaccharide nanoparticle is a natural polysaccharide. Examples of natural polysaccharides include, but are not limited to chitin, sodium alginate, and carboxymethyl cellulose. In some embodiments, the polysaccharide nanoparticle is a chitin nanoparticle. In some embodiments, the chitin nanoparticle is partially deacetylated. Adjustable deacetylation on chitin nanoparticles not only controls the formation of ordered protein structures but also control molecular alignments. As a result, not only the modulus and breaking strength but also breaking strain of composites can be substantially improved. In some embodiments, additional coupling agents and compatibilizers is avoided. Typically, reinforced composites with nanoparticles display an increase in breaking strength and modulus but a decrease in breaking strain. In this disclosure, provided are reinforced composites where elongation, breaking strength, and modulus of the composites can be improved simultaneously.

The method provided herein provides benefits such as cost-effectiveness and ease. In some embodiments, the nanoparticles are prepared by facile acid and alkali hydrolysis, using common mineral acid and inorganic alkali.

Provided in the present disclosure is a method for preparing keratin-based composites. In some embodiments, the method includes mixing polysaccharide nanoparticles and a keratin solution to form a nanoparticle-keratin solution; and solvent casting the nanoparticle-keratin solution to form keratin-based composites.

In some embodiments, the method involves mixing polysaccharide nanoparticles and a keratin solution to form a nanoparticle-keratin solution. In some embodiments, the method involves adding polysaccharide nanoparticles to a keratin solution to form a nanoparticle-keratin solution. In some embodiments, the concentration of nanoparticles in the nanoparticle-keratin solution is from about 0.2% to about 10% by weight, such as about 0.2% to about 7%, about 0.2% to about 5%, about 0.2% to about 4%, about 0.2% to about 3%, about 3% to about 10%, about 0.5% to about 10%, about 0.5% to about 7%, about 0.5% to about 5%, about 0.5% to about 3%, about 1% to about 10%, about 1% to about 7%, about 1% to about 5, about 1% to about 4%, about 1% to about 3%, about 1% to about 2%, about 2% to about 5%, about 2% to about 4%, about 2% to about 3%, about 3% to about 5%, about 3% to about 4%, about 4% to about 5%, or about 1%, about 1.5%, about 2%, about 2.5%, about 3%, about 3.5%, about 4%, about 4.5%, or about 5%. In some embodiments, the concentration of the chitin nanoparticles in the chitin-keratin solution is about 1% to about 5% by weight. In some embodiments, the concentration of the chitin nanoparticles in the chitin-keratin solution is about 2% to about 4% by weight. In some embodiments, the concentration of chitin nanoparticles in the chitin-keratin solution is about 3% by weight.

In some embodiments, the polysaccharide nanoparticles include natural polysaccharides. A "natural polysaccharide," as used herein, refers to a polysaccharide that is obtained from a naturally occurring source. In some embodiments, the natural polysaccharides have one or more hydroxyl groups, aldehyde groups, amino groups, carboxyl groups, or derivatives thereof. Examples of these derivatives include, but are not limited to, esters, amides, and ethers. In some embodiments, the natural polysaccharides have one or more amino groups, carboxyl groups, or derivatives thereof. In some embodiments, the polysaccharide nanoparticles contain chitin, sodium alginate, carboxymethyl cellulose, or combinations thereof.

In some embodiments, the nanoparticles have an average particle size of about 50 nm to about 500 nm, such as about 50 nm to about 450 nm, about 50 nm to about 400 nm, about 50 nm to about 350 nm, about 50 nm to about 300 nm, about 50 nm to about 200 nm, about 50 nm to about 150 nm, about 50 nm to about 100 nm, about 80 nm to about 500 nm, about 80 nm to about 450 nm, about 80 nm to about 400 nm, about 80 nm to about 350 nm, about 80 nm to about 300 nm, about 80 nm to about 250 nm, about 80 nm to about 200 nm, about 80 nm to about 150 nm, about 100 nm to about 500 nm, about 100 nm to about 400 nm, about 100 nm to about 350 nm, about 100 nm to about 300 nm, about 100 to about 250 nm, about 100 nm to about 150 nm, about 80 nm to about 140 nm, about 80 nm to about 130 nm, about 80 nm to about 120 nm, about 90 nm to about 150 nm, about 90 nm to about 140 nm, about 90 nm to about 130 nm, about 90 nm to about 120 nm, about 90 nm to about 110 nm, about 100 nm to about 140 nm, about 100 nm to about 130 nm, or about 100 nm to about 125 nm In some embodiments, the nanoparticles have an average particles size of about 100 nm to about 120 nm.

In some embodiments, the nanoparticles have a polydispersity index of about 0.2 to about 0.3, such as about 0.225 to about 0.3, about 0.25 to about 0.3, of about 0.26 to about 0.3. "Polydispersity index," as used herein, is a measure of the heterogeneity of a sample based on size.

In some embodiments, the polysaccharide nanoparticles are chitin nanoparticles. "Chitin nanoparticles," as used herein, refers to nanoparticles derived from chitin. In some embodiments, the chitin nanoparticles are at least partially deacetylated. "Partially deacetylated," as used herein, means at least 1% of the acetyl groups of the chitin have been removed to reveal amino groups. In some embodiments, the chitin nanoparticles have a degree of deacetylation from about 1% to about 99%, such as about 1% to about 95%, about 1% to about 90%, about 1% to about 85%, about 1% to about 80%, about 1% to about 75%, about 1% to about 70%, about 1% to about 65%, about 1% to about 60%, about 1% to about 55%, about 1% to about 50%, about 1% to about 45%, about 1% to about 40%, about 1% to about 35%, about 1% to about 30%, about 1% to about 25%, about 1% to about 20%, about 1% to about 15%, about 1% to about 10%, about 1% to about 5%, about 5% to about 99%, about 5% to about 95%, about 5% to about 90%, about 5% to about 85%, about 5% to about 80%, about 5% to about 75%, about 5% to about 70%, about 5% to about 65%, about 5% to about 60%, about 5% to about 55%, about 5% to about 50%, about 5% to about 45%, about 5% to about 40%, about 5% to about 35%, about 5% to about 30%, about 5% to about 25%, about 5% to about 20%, about 5% to about 15%, about 5% to about 10%, about 10% to about 99%, about 10% to about 95%, about 10% to about 90%, about 10% to about 85%, about 10% to about 80%, about 10% to about 75%, about 10% to about 70%, about 10% to about 65%, about 10% to about 60%, about 10% to about 55%, about 10% to about 50%, about 10% to about 45%, about 10% to about 40%, about 10% to about 35%, about 10% to about 30%, about 10% to about 25%, about 10% to about 20%, about 10% to about 15%, about 15% to about 99%, about 15% to about 95%, about 15% to about 90%, about 15% to about 85%, about 15% to about 80%, about 15% to about 75%, about 15% to about 70%, about 15% to about 65%, about 15% to about 60%, about 15% to about 55%, about 15% to about 50%, about 15% to about 45%, about 15% to about 40%, about 15% to about 35%, about 15% to about 30%, about 15% to about 25%, about 15% to about 20%, about 20% to about 99%, about 20% to about 95%, about 20% to about 90%, about 20% to about 85%, about 20% to about 80%, about 20% to about 75%, about 20% to about 70%, about 20% to about 65%, about 20% to about 60%, about 20% to about 55%, about 20% to about 50%, about 20% to about 45%, about 20% to about 40%, about 20% to about 35%, about 20% to about 30%, about 20% to about 25%, about 25% to about 99%, about 25% to about 95%, about 25% to about 90%, about 25% to about 85%, about 25% to about 80%, about 25% to about 75%, about 25% to about 70%, about 25% to about 65%, about 25% to about 60%, about 25% to about 55%, about 25% to about 50%, about 25% to about 45%, about 25% to about 40%, about 25% to about 35%, about 25% to about 30%, about 30% to about 99%, about 30% to about 95%, about 30% to about 90%, about 30% to about 85%, about 30% to about 80%, about 30% to about 75%, about 30% to about 70%, about 30% to about 65%, about 30% to about 60%, about 30% to about 55%, about 30% to about 50%, about 30% to about 45%, about 30% to about 40%, about 30% to about 35%, about 35% to about 99%, about 35% to about 95%, about 35% to about 90%, about 35% to about 85%, about 35% to about 80%, about 35% to about 75%, about 35% to about 70%, about 35% to about 65%, about 35% to about 60%, about 35% to about 55%, about 35% to about 50%, about 35% to about 45%, about 35% to about 40%, about 40% to about 99%, about 40% to about 95%, about 40% to about 90%, about 40% to about 85%, about 40% to about 80%, about 40% to about 75%, about 40% to about 70%, about 40% to about 65%, about 40% to about 60%, about 40% to about 55%, about 40% to about 50%, about 40% to about 45%, about 45% to about 99%, about 45% to about 95%, about 45% to about 90%, about 45% to about 85%, about 45% to about 80%, about 45% to about 75%, about 45% to about 70%, about 45% to about 65%, about 45% to about 60%, about 45% to about 55%, about 45% to about 50%, about 50% to about 99%, about 50% to about 95%, about 50% to about 90%, about 50% to about 85%, about 50% to about 80%, about 50% to about 75%, about 50% to about 70%, about 50% to about 65%, about 50% to about 60%, about 50% to about 55%, about 55% to about 99%, about 55% to about 95%, about 55% to about 90%, about 55% to about 85%, about 55% to about 80%, about 55% to about 75%, about 55% to about 70%, about 55% to about 65%, about 55% to about 60%, about 60% to about 99%, about 60% to about 95%, about 60% to about 90%, about 60% to about 85%, about 60% to about 80%, about 60% to about 75%, about 60% to about 70%, about 60% to about 65%, about 65% to about 99%, about 65% to about 95%, about 65% to about 90%, about 65% to about 85%, about 65% to about 80%, about 65% to about 75%, about 65% to about 70%, about 70% to about 99%, about 70% to about 95%, about 70% to about 90%, about 70% to about 85%, about 70% to about 80%, about 70% to about 75%, about 75% to about 99%, about 75% to about 95%, about 75% to about 90%, about 75% to about 85%, about 75% to about 80%, about 80% to about 99%, about 80% to about 95%, about 80% to about 90%, about 80% to about 85%, about 85% to about 99%, about 85% to about 95%, about 85% to about 90%, about 90% to about 99%, about 90% to about 95%, or about 95% to about 99%. In some embodiments, the chitin nanoparticles have a degree of deacetylation from about 5% to about 60%. In some embodiments, the chitin nanoparticles have a degree of deacetylation from about 5% to about 50%, from about 10% to about 60%, from about 7% to about 60%, or from about 10% to about 50%. In some embodiments, the chitin nanoparticles have a degree of deacetylation of about 7%. In some embodiments, the chitin nanoparticles have a degree of deacetylation of about 12%. In some embodiments, the chitin nanoparticles have a degree of deacetylation of about 23%. In some embodiments, the chitin nanoparticles have a degree of deacetylation of about 56%.

Also provided in the present disclosure are methods of preparing polysaccharide nanoparticles. In some embodiments, the nanoparticles are chitin nanoparticles. The chitin can be obtained from any suitable source. In some embodiments, the source of the chitin is a crustacean, such as crab or shrimp. In some embodiments, the source of the chitin is crab shells. In some embodiments, the source of the chitin is shrimp. In some embodiments, the preparation of chitin nanoparticles includes removing protein and lipids in crab shells. In some embodiments, the protein and lipids are removed from crab shells using an alkali solution. In some embodiments, the crab shells are then demineralized using an acidic solution. In some embodiments, the crab shells are further treated with an alkali solution to remove protein. In some embodiments, the resultant chitin is rinsed in organic solvent, such as acetone and ethanol.

In some embodiments, the chitin nanoparticles are partially deacetylated. In some embodiments, the chitin nanoparticles are prepared by a process that includes treating chitin with an acid to form an acid hydrolyzed chitin; and treating the acid hydrolyzed chitin with an alkali solution to form partially deacetylated chitin nanoparticles.

In some embodiments, chitin is treated with an acid to form an acid hydrolyzed chitin. Any acid can be used in the methods of preparing the chitin nanoparticles. Exemplary acids include, but are not limited to hydrochloric acid and sulfuric acid. In some embodiments, the acid contains hydrochloric acid, sulfuric acid, or a combination thereof.

In some embodiments, the acid hydrolyzed chitin is treated with an alkali solution. Any alkali solution can be used in the methods of preparing the chitin nanoparticles. Exemplary alkali solutions include, but are not limited to sodium hydroxide solutions and potassium hydroxide solutions. In some embodiments, the alkali solution contains sodium hydroxide, potassium hydroxide, or a combination thereof.

In some embodiments, the partially deacetylated chitin is prepared by controlled deacetylation. As used herein, "controlled deacetylation" refers to a process where the degree of deacetylation of the chitin nanoparticles is engineered by controlling the reaction conditions of the treatment of the acid hydrolyzed chitin with an alkali solution. In some embodiments, the degree of deacetylation is controlled by the amount of time that the acid hydrolyzed chitin is treated with the alkali solution. In some embodiments, the acid hydrolyzed chitin is treated with an alkali solution for a time between about 0.5 hours to about 20 hours, such as between about 0.5 hours and about 15 hours, between about 0.5 hours and about 10 hours, between about 1 hour and about 20 hours, between about 1 hour and about 15 hours, between about 1 hour and about 10 hours, between about 2 hours and about 15 hours, or between about 2 hours and about 10 hours. In some embodiments, the acid hydrolyzed chitin is treated with an alkali solution at a temperature of about 100 to 150° C., such as about 100 to 140° C., about 100 to 130° C., about 100 to 120° C., about 110 to about 150° C., or about 120 to about ° C. In some embodiments, the acid hydrolyzed chitin is treated with an alkali solution for a time between 2 and 10 hours at a temperature of about 120° C.

In some embodiments of the method, the polysaccharide nanoparticles are mixed with a keratin solution to form a nanoparticle-keratin solution. In some embodiments, the keratin solution has a concentration from about 1% to about 30% keratin, such as about 1% to about 25% keratin, about 1% to about 20% keratin, about 1% to about 15% keratin, about 5% to about 30% keratin, about 5% to about 25% keratin, about 5% to about 20% keratin, about 5% to about 15% keratin, about 5% to about 12% keratin, about 5% to about 10% keratin, about 5% keratin to about 7% keratin, about 7% to about 30% keratin, about 7% to about 25% keratin, about 7% to about 20% keratin, about 7% to about 15% keratin, about 7% to about 12% keratin, about 7% to about 10% keratin, about 10% to about 30% keratin, about 10% to about 25% keratin, about 10% to about 20% keratin, about 10% to about 15% keratin, or about 10% to about 12% keratin. In some embodiments, the keratin solution has a concentration of about 10% keratin.

In some embodiments, the keratin solution comprises a reducing agent. In some embodiments, the reducing agent comprises one or more thiol groups. In some embodiments, the reducing agent comprises mercaptoethanol, cysteine, dithiothreitol, 1,2-ethanedithiol, 1,3-benzenedithiol, bis(2-mercaptoethyl) ether, ethylene glycol bisthioglycolate, or a combination thereof.

In some embodiments, the method includes preparing a keratin solution. The keratin solution can be used in the methods described in the present disclosure. In some embodiments, the keratin solution is prepared from a keratinous material. In some embodiments, the keratin solution is prepared by a method that includes extracting keratin from a keratinous material to form extracted keratin; and dissolving the extracted keratin in an aqueous solution to form a keratin solution. In some embodiments, the aqueous solution contains a reducing agent.

The method of preparing a keratin solution involves extracting keratin from a keratinous material to form extracted keratin. Any material that contains keratin can be used in the preparation of the keratin solution. In some embodiments, the keratinous material contains animal hair, horn, feather, or a combination thereof. In some embodiments, the feather is selected from a duck feather, a goose feather, a chicken feather, or a combination thereof. In some embodiments, the animal hair is selected from wool, camel hair, alpaca hair, rabbit hair, or a combination thereof.

In some embodiments, the keratinous material is washed prior to using in the methods. In some embodiments, the washing removes impurities. In some embodiments, the impurities include lipids.

The method of preparing a keratin solution involves dissolving extracted keratin in an aqueous solution. In some embodiments, the dissolving comprises maintaining a pH value of the aqueous solution between about 7.5 and about 11, such as between about 7.5 and about 10, between about 7.5 and about 9.5, between about 7.5 and about 9, between about 8 and about 11, between about 8 and about 10.5, between about 9 and about 11, or between about 9 and about 10.5. In some embodiments, the dissolving comprises maintaining a pH value of the aqueous solution between about 8 and about 10, such as between about 8 and about 9 or between about 9 and about 10. In some embodiments, the pH value is maintained by adding a base. Any suitable base can be used to maintain the pH of the aqueous solution while the keratin is dissolved in the aqueous solution. For example, the base can be a strong base, such as NaOH or KOH.

In some embodiments, the molecular entanglement (n value) of keratin in the nanoparticle-keratin solution is identical to or higher than the n value of the same keratin solution without the nanoparticles. The n value can be obtained from rheological properties. The higher the n value, the lower the degree of molecular entanglement. In some embodiments, the n value of the solution with nanoparticles is smaller than the n value of the same solution without the nanoparticles. In some embodiments, a higher n value in solution helps to form ordered protein structures and improve the alignment of molecular chains. As a result, strength and flexibility of the composites can be improved compared to the same composites without nanoparticles.

In some embodiments, the method includes solvent casting the nanoparticle-keratin solution to form keratin-based composites. In some embodiments, solvent casting involves removing the solvent from the keratin solution to produce a solid layer. In some embodiments, the resulting solid layer is a composite material, such as composite boards, films, or fibers. In some embodiments, the resulting solid layer is a board. In some embodiments, the resulting solid layer is a film. In some embodiments, the resulting solid layer is a fiber. In some embodiments, the solvent is removed by heating the keratin solution to evaporate the solvent. For example, the keratin solution can be heated at a temperature of about 50° C. to about 90° C., such as about 70° C. In some embodiments, the keratin solution is heated for about 0.1 h to about 2 h, such as about 0.1 h to about 1 h, or about 0.5 h.

In some embodiments, the method involves post treatment of the keratin-based composites. In some embodiments, post treatment of the composites is performed to anchor composite structures, such as through the formation of crosslinkages. In some embodiments, the post treatment anchors ordered protein and particle structures. In some embodiments, heating the composites allows for the formation of amide crosslinkages between amino groups of the nanoparticles and carboxyl groups of the keratin. In some embodiments, post treatment includes heating the keratin-based composites. In some embodiments, the heating is performed after the formation of the composites. In some embodiments, the composites are heated at a temperature of about 40° C. to about 60° C. In some embodiments, the composites are heated at a temperature of about 45° C. to about 55° C., or about 50° C. In some embodiments, the composites are heated for a time of about 1 h to about 4 h. In some embodiments, the composites are heated for about 1.5 h to about 3 h, or for about 2 h. In some embodiments, the composites are heated at a temperature of about 45° C. to about 55° C. for a time of about 1.5 h to about 3 h.

In some embodiments, the thickness of the composites is from about 50 micrometers to about 200 micrometers, such as about 50 micrometers to about 150 micrometers, about 50 micrometers to about 100 micrometers, about 100 micrometers to about 200 micrometers, about 100 micrometers to about 150 micrometers, or about 150 micrometers to about 200 micrometers. In some embodiments, the composites are a fiber having a diameter of about 5 micrometers to about 30 micrometers, such as about 5 micrometers to about 25 micrometers, about 5 micrometers to about 20 micrometers, about 5 micrometers to about 15 micrometers, about 10 micrometers to about 30 micrometers, about 10 micrometers to about 25 micrometers, about 15 micrometers to about 30 micrometers, about 15 micrometers to about 20 micrometers, about 10 micrometers to about 30 micrometers, about 10 micrometers to about 25 micrometers, about 10 micrometers to about 20 micrometers, about 10 micrometers to about 15 micrometers, about 15 micrometers to about 25 micrometers, or about 15 micrometers to about 20 micrometers. In some embodiments, the composites are a fiber having a diameter of about 15 micrometers.

In some embodiments, the composites comprise at least about 80% keratin. In some embodiments, the composites comprise at least about 85% keratin, such as at least about 87.5% keratin, at least about 90% keratin, at least about 92.5% keratin, or at least about 95% keratin. In some embodiments the composite comprises from about 80% to about 95% keratin.

The methods of the present disclosure result in keratin-based composites that display improved mechanical properties as compared to the same keratin-based composites that do not contain the polysaccharide nanoparticles of the present disclosure. In some embodiments, the keratin-based composites exhibit increased elongation as compared to the same keratin-based composites that do not contain polysaccharide nanoparticles. In some embodiments, the keratin-based composites exhibit increased breaking strength as compared to the same keratin-based composites that do not contain polysaccharide nanoparticles. In some embodiments, the keratin-based composites exhibit increased modulus as compared to the same keratin-based composites that do not contain polysaccharide nanoparticles. In some embodiments, the keratin-based composites exhibit increased breaking stress as compared to the same keratin-based composites that do not contain polysaccharide nanoparticles. In some embodiments, the keratin-based composites exhibit increased breaking strain as compared to the same keratin-based composites that do not contain polysaccharide nanoparticles.

In some embodiments, the elongation of the composites is increased as compared to the same composites without the nanoparticles. "Elongation," as used herein, refers to the percentage of increase in length that occurs before a material breaks under tension and/or loading. In some embodiments, the reinforced composites of the present disclosure exhibits increased elongation over the same composites without the nanoparticles.

In some embodiments, the modulus of the composites is increased as compared to the same composites without the nanoparticles. "Modulus," as used herein, refers to the ratio of uniaxial stress over the uniaxial strain in the range of stress in which Hook's Law holds. This can be experimentally determined from the initial slope of a stress-strain curve created during tensile tests conducted on a sample of the material. In some embodiments, the reinforced composites of the present disclosure exhibits increased modulus over the same composites without the nanoparticles.

In some embodiments, the breaking stress of the composites is increased as compared to the same composites without the nanoparticles. As used herein, the "breaking stress" of the composites is the maximum amount of tensile stress that the composite can withstand before breaking into two or more parts. In some embodiments, the reinforced composites of the present disclosure exhibit increased breaking stress over the same composites without the nanoparticles. In some embodiments, the breaking stress of the composites is higher than the same composites without the nanoparticles. In some embodiments, the composites have a breaking stress at least about 150% greater than the same composites without the nanoparticles, such as at least about 200% greater, or about 230% greater. In some embodiments, the composites have a breaking stress of about 15 MPa to about 40 MPa. In some embodiments, the composites have a breaking stress of about 20 MPa to about 35 MPa.

In some embodiments, the breaking strain of the composites is higher than the same composites without the nanoparticles. In some embodiments, the composites have a breaking strain at least about 200% greater than the same composites without the nanoparticles, such as at least about 250% greater, or about 260% greater. In some embodiments, the composites have a breaking strain of from about 15% to about 50%. In some embodiments, the composites have a breaking strain of from about 20% to about 40%. "Breaking strain," as used herein, refers to the % of elongation in length when break occurs compared to the initial length.

In some embodiments, the degree of crystallinity of the composites is higher than the same composites without the nanoparticles. In some embodiments, the nanoparticles are chitin nanoparticles. In some embodiments, a higher degree of crystallinity results from the strong interactions between keratin and the nanoparticles, allowing for the formation of more ordered structures as compared to a majority of molecular chains being randomly arranged in the composites without nanoparticles. In some embodiments, the degree of crystallinity of the composites is greater than about 22%. In some embodiments, the degree of crystallinity of the composites is at least about 25%.

In some embodiments, the viscosity of the nanoparticle-keratin solution is higher than the viscosity of the keratin solution prior to adding the nanoparticles. In some embodiments, the K value (Pa·s$^n$) of the nanoparticle-keratin solution is higher than the viscosity of the keratin solution prior to adding the nanoparticles.

Also provided in the present disclosure is keratin-based composites prepared by the methods disclosed within. The keratin-based composites of the present disclosure are useful in applications including mulch films, coating materials, food packaging, thermal isolation, microwave adsorption, sound adsorption, and semi-conduction. The keratin-based composites are ductile and tough with good wet durability and the method is a clean and cost-effective process.

In addition, the methods of the present disclosure allow for coupling agents and compatibilizers to be avoided. In some embodiments, the composites are free of a coupling agent. In some embodiments, the composites are free of a compatibilizer.

An exemplary method of preparing keratin-based composites is as follows. In some embodiments, the keratinous materials are washed to remove the impurities before drying. In some embodiments, the keratinous materials are feathers. In some embodiments, the impurities are lipids. In some embodiments, after drying, an aqueous alkali solution is used on the dried material. In some embodiments, the aqueous alkali solution contains urea, sodium dodecyl sulfate and thiol-based reducing agents.

In some embodiments, partially deacetylated chitin nanoparticles are prepared. In some embodiments, protein and lipids in crab shells are removed using an alkali solution. In some embodiments, the alkali solution is 0.5 M NaOH. In some embodiments, the crab shells are demineralized using an acid solution. In some embodiments, the acid solution is 0.3 M HCl. In some embodiments, the shells are treated with an alkali solution to further remove protein. In some embodiments, the alkali solution is 2.5 M NaOH solution. In some embodiments, the resultant chitin is rinsed with an organic solvent, an alcohol, or both. In some embodiments, the resultant chitin is rinsed with acetone and ethanol. In some embodiments, the resultant chitin is rinsed three times. In some embodiments, the chitin is processed for different cycles of acid treatment. In some embodiments, chitin is added into a solution containing 3 M HCl for 1.5 h at 90° C. In some embodiments, in between each cycle, the chitin is centrifuged for removal of acid. In some embodiments, acid hydrolysis is used. In some embodiments, 65% sulfuric acid is used to hydrolyze chitin for 15 to 120 min. In some embodiments, the chitin solids are hydrolyzed in an alkali solution. In some embodiments, the chitin solids are hydrolyzed in a 40% NaOH solution at 120° C. for different durations for deacetylation. In some embodiments, after the hydrolysis, chitin is further recovered by centrifugation. In some embodiments, the chitin is resuspended in distilled water. In some embodiments, acid is added to lower the pH. In some embodiments, several droplets of HCl are added to lower the pH. In some embodiments, dialysis is performed with cellulose dialysis membranes. In some embodiments, the membranes have a molecular weight cut-off of 3000. In some embodiments, the final chitin nanoparticles with different degrees of deacetylation are further dispersed using a homogenizer. In some embodiments, dry nanoparticles are obtained by lyophilizing.

In some embodiments, keratin/chitin nanoparticles composites are prepared. In some embodiments, keratin extracts are added to water containing a reducing agent and chitin nanoparticles. In some embodiments, the water contains 10% thiol-based reducing agents and 1-5% chitin nanoparticles with different degrees of deacetylation based on the weight of keratin. In some embodiments, the keratin solution prepared is a 10% keratin solution. In some embodiments, during the dissolution, several droplets of a base are added to maintain the pH of the solution at weak alkalinity. In some embodiments, the base is NaOH. In some embodiments, before the film casting, the solution is kept at 70° C. for 0.5 h.

In some embodiments, after solvent evaporation, the composite films are heated for further structural anchoring. In some embodiments, the composite films are heated at 50° C. for 2.5 h.

In some embodiments, the methods of the present disclosure achieve the substantial formation of ordered keratin structures as well as aligned and entangled protein chains in composites with reinforcement of polysaccharide nanoparticles. In some embodiments, the nanoparticles form chemical and physical interactions with keratin, such as through crosslinkages. Without wishing to be bound by any particular theory, it is believed that because of large surface areas, accessible bonding sites, ordered shape, high compatibility, and a high amount of bonding sites, ordered protein structures are able to form after addition of nanoparticles.

The method disclosed herein is able to induce formation of ordered protein structures as well as controlled alignment and entanglement of molecular chains in full bio composites by reinforced interfacial interactions between nanoparticles and matrix. In some embodiments, via controlled deacetylation, compatibility between chitin nanoparticles and protein is largely improved because nanoparticles form strong physical and chemical interactions, such as through the formation of crosslinkages between amino groups of the nanoparticles and carboxyl groups of the keratin. In some embodiments, toughness of the keratin-based composites, such as the flexibility, can be substantially improved. The methods of the present disclosure can be applied not only in production of high-quality keratin-based composites, but also in production of other protein-based bio composites. Examples of other protein-based bio composites include, but are not limited to, soy protein, wheat gluten, zein, silk, and collagen.

Highly ductile and wet-durable bio-composites from keratin reinforced by polysaccharide nanoparticles have been developed according to the method disclosed herein. Though featuring good biodegradability and biocompatibility, poultry-feather-extracted keratin-based composites usually suffered from poor ductility and moisture stabilities because of poor interfacial properties, limited recovery of ordered protein structures and crosslinkages. In the method disclosed herein, chitin-nanoparticles, such as chitin nanoparticles with engineered deacetylation, can be used to reinforce keratin. In some embodiments, via engineered deacetylation, chitin-nanoparticles not only improve interfacial interactions but also form crosslinkages with keratin. In some embodiments, ordered keratin structures with a high degree of entanglement in composites are substantially formed without addition of any coupling agents. Furthermore, engineered deacetylation for chitin could adjust the wet performance of composites via control of hydrophilicity of matrix and reinforcements. Via control of regularity and hydrophilicity of molecules by chitin-nanoparticles, mechanical properties and wet performance of keratin-based composites can be substantially improved. Reinforced keratin composites had a 230%, 260%, 540% increase in breaking strain, breaking stress and ductility, respectively as well as 94% weight retention after immersed in water for 1 week.

In some embodiments, the method of reinforcement provided herein using compatible and chemically coupled partially-deacetylated chitin nanoparticles allows for up to four times increase in elongation of keratin-based composites without the addition of coupling agents.

In some embodiments, green composites with high ductility and wet durability from keratin and chitin nanoparticles have been developed using clean technology in an aqueous system. As disclosed herein, chitin nanoparticles with engineered deacetylation were used as reinforcement of keratin films for improvement of ductility and wet durability. In some embodiments, via controlled deacetylation, chitin nanoparticles not only improve interfacial interactions but also form crosslinkages with keratin. As a result, substantial ordered structures with high degrees of entanglement can be formed after the addition of chitin nanoparticles with controlled deacetylation. In some embodiments, when the degree of deacetylation is lower than 30%, an increase in deacetylation of chitin increases the tensile strength and toughness, as well as the weight retention of composites substantially. In some embodiments, when deacetylation of chitin is higher than 30%, the flexibility of composites is remarkably improved. Furthermore, the swelling ratio can be increased while the weight retention of composites remained high. In some embodiments, with engineered deacetylation, the ductility of keratin/chitin composites is increased compared to keratin films. In some embodiments, the ductility is increased over about 500%, such as about 540%. In some embodiments, the weight retention of composites is up to 94%. The desirable mechanical and wet properties of the keratin-based composites of the present disclosure provide a high potential for the keratin to be applied in the agricultural industry.

Thus, provided in the present disclosure is a process for preparing keratin-based composites. In some embodiments, the method includes:
 (i) Preparing a keratin solution;
 (ii) Preparing chitin nanoparticles with controlled deacetylation;
 (iii) Incorporating nanoparticles into the keratin solution;
 (iv). Solvent casting to prepare composites; and
 (iv) Post treating to anchor composite structures.

In some embodiments, the keratin solution has a concentration about 5% to about 15%.

In some embodiments, the chitin nanoparticles have a particle size about 80 to 500 nm.

In some embodiments, the chitin nanoparticles have degrees of deacetylation about 5 to 50%.

In some embodiments, the concentration of chitin nanoparticles in keratin is about 1% to 5%.

In some embodiments, thickness of the composites is about 50 to 200 micrometers.

In some embodiments, the diameter of the composite fibers is about 15 micrometers. I In some embodiments, the composites comprise at least about 80% keratin. In some embodiments, the composites comprise at least about 85% keratin.

In some embodiments, the composites have a breaking stress of about 15 to 40 MPa. In some embodiments, the composites have a breaking strain about 15% to 50%.

In some embodiments, the molecular entanglement (n value in rheology) of keratin in solution after addition of nanoparticles is identical or higher than that of keratin solution without nanoparticles (n value of solution with nanoparticles should be smaller than that without nanoparticles).

In some embodiments, the keratin solution comprises a reducing agent. In some embodiments, the reducing agent comprises one or more thiol groups. In some embodiments, the reducing agent comprises mercaptoethanol, cysteine, dithiothreitol, 1,2-ethanedithiol, 1,3-benzenedithiol, bis(2-mercaptoethyl) ether, ethylene glycol bisthioglycolate, or a combination thereof.

In some embodiments, the keratin solution is prepared from a keratinous material.

In some embodiments, the process further comprises preparing the keratin solution.

In some embodiments, preparing the keratin solution comprises:
  i. extracting keratin from a keratinous material to form extracted keratin; and
  ii. dissolving the extracted keratin in an aqueous solution comprising a reducing agent to form the keratin solution.

In some embodiments, preparing the keratin solution further comprises:
  iii. adding partially deacetylated chitin nanoparticles or other particles having strong affinity to protein; and
  iv. anchoring composite structures.

In some embodiments, the keratinous material comprises one or more of: animal hair, horn, and feather including but not limited to wool, camel hair, alpacas hair and rabbit hair. In some embodiments, the feather is a duck feather, a goose feather, a chicken feather, or a combination thereof. In some embodiments, the hair is wool, camel hair, alpaca hair, rabbit hair, or a combination thereof.

In some embodiments, the pH of the keratin solution was kept between 8 to 10.

In some embodiments, degree of crystallinity of composites was higher than that without nanoparticles.

In some embodiments, post treatment is conducted after formation of composites. In some embodiments, heat treatment was conducted to anchor ordered protein and particle structures. In some embodiments, the temperature of heat treatment was 45 to 55° C. and duration was 1.5 to 3 h.

In some embodiments, the partially deacetylated chitin nanoparticles are prepared via acid hydrolysis followed by alkali treatment. In some embodiments, acids are selected from hydrochloric acid, sulfuric acid and a combination thereof. In some embodiments, the alkali is selected from sodium hydroxide, potassium hydroxide and a combination thereof.

In some embodiments, the nanoparticles are selected from natural polysaccharides with amino groups, carboxyl and their derivatives. In some embodiments, the nanoparticles could be but not limited to partially deacetylated chitin, chitosan with low degree of deacetylation, sodium alginate and carboxymethyl cellulose.

In some embodiments, the viscosity of keratin solution after addition nanoparticles was higher than that before addition of nanoparticles.

In some embodiments, the molecular entanglement in keratin solution after addition of nanoparticles was higher than that before addition of nanoparticles. The molecular entanglement in solution can be illustrated by n value obtained from rheological properties. The higher n value, the lower degree of molecular entanglement.

Also provided herein is keratin-based composites prepared by the disclosed process.

EXAMPLES

The compounds and methods of the present disclosure are further described in the following examples, which do not limit the scope of the claims.

Materials

Chicken feather barbs were provided by Feather Fiber Corporation, Nixa, MO. Chitin was provided by a company in China. Urea was purchased from Oak Chemical, Inc. West Columbia, SC. Cysteine, sodium sulfate, mercaptoethanol purchased from EMD Chemicals Inc. Gibbstown, NJ. Sodium hydroxide and hydrochloric acid were purchased from VWR International, Bristol, CT NY.

Preparation of Chitin Nanoparticles with Different Degrees of Deacetylation

The chitin was processed for 3 cycles in which chitin was added into the solution containing 3 M HCl for 1.5 h at 90° C. In between each cycle, chitin was centrifuged for removal of acid. The chitin solids were then hydrolyzed in 40% NaOH solution at 120° C. for 2, 5, and 10 hours for deacetylation. After the hydrolysis, chitin was further recovered by centrifugation and resuspended in distilled water. Several droplets of HCl were added to lower the pH. Dialysis was performed with cellulose dialysis membranes with molecular weight cut-off of 3000. The final chitin nanoparticles with different degrees of deacetylation were further dispersed using a homogenizer. Dry nanoparticles were obtained by lyophilizing. Prepared chitin nanoparticles were labeled as chitin-0, chitin-2, chitin-5, and chitin-10 based on the different times of alkali hydrolysis.

Example 1

Keratin was extracted from chicken feathers using 2M urea and 10% SDS and cysteine based on the weight of feathers. Then keratin extracts were added to water containing 10% mercaptoethanol and 3% chitin nanoparticles with degrees of deacetylation of 23% based on the weight of keratin and to prepare 10% keratin solution. During the dissolution, several droplets of NaOH were added to maintain the pH of the solution within 8.0±0.1. Before the film casting, the solution was kept at 70° C. for 0.5 h. After solvent evaporation, composite films were heated at 50° C. for 2.5 h. For comparison, keratin films without nanoparticles were prepared. The results are shown in Table 1.

TABLE 1

Properties of keratin products

| Products | Breaking Stress (MPa) | Breaking Strain | Degree of crystallinity |
|---|---|---|---|
| Keratin films without nanoparticles | 11.2 ± 1.8 | 12.8 ± 0.7% | 22 ± 2% |
| Keratin films with nanoparticles | 34.6 ± 1.9 | 19.4 ± 1% | 37 ± 2% |

Example 2

Keratin was extracted from chicken feathers using 2M urea and 10% SDS and cysteine based on the weight of feathers. Then keratin extracts were added to water containing 10% mercaptoethanol and 3% chitin nanoparticles with degrees of deacetylation of 55% based on the weight of keratin and to prepare 10% keratin solution. During the dissolution, several droplets of to NaOH were added to maintain the pH of the solution within 8.0±0.1. Before the film casting, the solution was kept at 70° C. for 0.5 h. After solvent evaporation, composite films were heated at 50° C. for 2.5 h. For comparison, keratin films without nanoparticles were prepared also. The results are shown in Table 2.

TABLE 2

Properties of keratin products

| Products | Breaking Stress (MPa) | Breaking Strain | Degree of crystallinity |
|---|---|---|---|
| Keratin films without nanoparticles | 11.2 ± 1.8 | 12.8 ± 0.7% | 22 ± 2% |
| Keratin films with nanoparticles | 19.2 ± 1.3 | 42.1 ± 2.1% | 27 ± 2% |

Example 3

Five percent of sucrose in water reacted with sodium periodate at room temperature for 5 h. The molar ratio of sucrose to periodate was 1:3. The pH of the reaction medium was kept at 5.5±0.1. After the reaction, a slight excess of barium dichloride was added to completely precipitate the oxidation agents. The mixture was filtrated to obtain the polyaldehyde derivatives of sucrose. Keratin was extracted from chicken feathers using 2M urea and 10% SDS and cysteine based on the weight of feathers. Then keratin extracts were added to water containing 10% mercaptoethanol and 2% chitin nanoparticles with degrees of deacetylation of 24% based on the weight of keratin and to prepare 10% keratin solution. The total weight of solution was 20 grams. During the dissolution, several droplets of NaOH were added to maintain the pH of the solution within 8.0±0.1. followed by heating solution at 70° C. for 0.5 h. Then 0.6 gram of prepared polyaldehyde solution was added into keratin solution. For comparison, keratin films without nanoparticles were prepared also. The results are shown in Table 3.

TABLE 3

Properties of keratin products

| Products | Breaking Stress (MPa) | Breaking Strain |
|---|---|---|
| Keratin films crosslinked with polyaldehydes but without nanoparticles | 24.5 ± 1.6 | 20.5 ± 2.6% |
| Keratin films crosslinked with polyaldehydes and added with nanoparticles | 35.5 ± 1.2 | 44.3 ± 2.4% |
| Keratin films with nanoparticles without aldimine crosslinkages | 31.3 ± 1.4 | 23.4 ± 2.9% |

Example 4

Keratin was extracted from chicken feathers using 2M urea and 10% SDS and cysteine based on the weight of feathers. Then keratin extracts were added to water containing 10% mercaptoethanol and 3% chitin nanoparticles with degrees of deacetylation of 7%, 12%, 23% and 56% based on the weight of keratin and to prepare 10% keratin solution. During the dissolution, several droplets of NaOH were added to maintain the pH of the solution within 8.0±0.1. The rheological properties of keratin solution were measured to study the interaction between keratin and nanoparticles. The results are shown in Table 4.

TABLE 4

Rheological properties of keratin solution with and without chitin nanoparticles

| Solutions | K value (Pa · sn) | n |
|---|---|---|
| Keratin | 0.15 | 0.28 |
| Keratin with chitin (Deacetylation degree 7%) | 0.21 | 0.34 |
| Keratin with chitin (Deacetylation degree 12%) | 0.42 | 0.28 |
| Keratin with chitin (Deacetylation degree 23%) | 0.65 | 0.24 |
| Keratin with chitin (Deacetylation degree 56%) | 0.66 | 0.24 |

3 wt % of nanoparticles based on the weight of keratin were added. The larger K, the higher viscosity. Lower n, a higher degree of molecular entanglement.

Table 4 shows the change in rheological properties of the keratin solution after the addition of chitin nanoparticles. Results show that the deacetylation of chitin nanoparticles could improve not only the compatibility between chitin and keratin but also interactions between keratin molecules. The addition of nanoparticles can substantially increase the viscosity, as shown in K value. Chitin nanoparticles with degree of deacetylation higher than 23% can increase overall molecular entanglement in the solution. Overall molecular entanglement decreased when adding chitin nanoparticles with degree of deacetylation below 12%. Because of the nature of nanoparticles and keratin, the addition of nanoparticles not only changes the surface behaviors of keratin molecules but also forms a new kind of physical crosslinkage between keratin molecules (Zhao et al., "Can more nanoparticles induce larger viscosities of nanoparticle-enhanced wormlike micellar system (NEWMS)?" Materials 10(9) (2017) 1096). Therefore, the addition of nanoparticles could increase the viscosity. Deacetylation can further improve the affinity between keratin and nanoparticles, forming new keratin-particle junctions. Such junctions could have each chitin nanoparticles interacting with much more keratin chains. These junctions acted as bridging joints, improving the keratin entangling with each other. Therefore, the n values of keratin after addition of chitin with degrees of deacetylation of 23% and 56% were lower than those of keratin without nanoparticles.

Characterization

Analysis of particles sizes and degrees of deacetylation of nanoparticles, rheological properties of keratin solution with nanoparticles, mechanical properties, wet properties, secondary structures, as well as molecular weight of keratin-based composites, and statistical analysis were conducted.

Results

Improvement of the Ductility of the Composites

Table 5 shows the particle sizes of chitin nanoparticles with different degrees of deacetylation. Results show chitin particles with different degrees of deacetylation had similar particle sizes and size distributions. The average size was around 110 nm. Because particle size could remarkably affect the properties of the matrix, to investigate the effect of deacetylation of particles, keeping chitin nanoparticles to similar particle sizes was crucial. To achieve the similarity in particle size and distribution, chitin was hydrolyzed in acidic medium to obtain nanoparticles first followed by alkali hydrolysis to prepare nanoparticles with different degrees of deacetylation. Size distribution of nanoparticles was indicated by polydispersity index. Smaller values of polydispersity index, narrower size distributions. Further deacetylation was not conducted because with higher degrees of deacetylation, chitin was difficult to form nanoparticles under the conditions used for keratin dissolution. Instead, flocculation was observed.

Table 5 also shows the degrees of deacetylation of chitin nanoparticles after alkali treatment. Results show that degrees of deacetylation of prepared chitin nanoparticles ranged from 7% to 56%. The degree of deacetylation increased linearly with hydrolysis time. A higher degree of deacetylation means higher amino content in chitin nanoparticles. Deacetylated chitin had been shown to have a higher binding affinity to protein than other polysaccharides, such as cellulose, acetylated chitin (Arola et al., "Binding of cellulose binding modules reveal differences between cellulose substrates," Scientific Reports, 6 (2016) 35358; Shinya et al., "The first identification of carbohydrate binding modules specific to chitosan," Journal of Biological Chemistry, 288(42) (2013) 30042-30053; Chen et al., "Proteomic analysis of polysaccharide-milk protein interactions induced by chitosan," Molecules, 20(5) (2015) 7737-7749). Also, amino groups have the potential to react with carboxyl groups on keratin for the formation of crosslinkages given that up to 12.5% of amino acid in keratin contains carboxyls as side groups (Gregg et al., "Feather keratin: composition, structure and biogenesis," Biology of the Integument, Springer, 1986, pp. 666-694). On the other hand, a higher degree of deacetylation on chitin nanoparticles would bring moisture into composites, resulting in a decrease in strength and wet durability. Therefore, deacetylation was engineered controlled for the optimization of keratin-based composites.

TABLE 5

Particle sizes, polydispersity index, and degrees of deacetylation of chitin nanoparticles

| Items | Hydrolysis time (h) | Average particle sizes/ Polydispersity Index | Degree of Deacetylation |
|---|---|---|---|
| Chitin-0 | 0 | 112 nm/0.265 | 7% |
| Chitin-2 | 2 | 104 nm/0.275 | 12% |
| Chitin-5 | 5 | 114 nm/0.284 | 23% |
| Chitin-10 | 10 | 118 nm/0.294 | 56% |

The polydispersity index (PI) is a measure of the heterogeneity of a sample based on size. Polydispersity can occur due to size distribution in a sample or agglomeration or aggregation of the sample during isolation or analysis. PI is closely related to the size distributions. Similar PI indicated similar size distributions of nanoparticles.

Table 6 shows the change in rheological properties of the keratin solution after the addition of chitin nanoparticles. Results show that the deacetylation of chitin nanoparticles could improve not only the compatibility between chitin and keratin but also interactions between keratin molecules. The addition of nanoparticles can substantially increase the viscosity, as shown in K value. Chitin nanoparticles with alkali treatment higher than 5 hours can increase overall molecular entanglement in the solution. Overall molecular entanglement decreased when adding chitin nanoparticles without alkali treatment. There was significant difference in n values between keratin and keratin with chitin-0 nanoparticles. Because of the nature of nanoparticles and keratin, the addition of nanoparticles not only changes the surface behaviors of keratin molecules but also forms a new kind of physical crosslinkages between keratin molecules. Therefore, the addition of nanoparticles could increase the viscosity. Deacetylation can further improve the affinity between keratin and nanoparticles, forming new keratin-particle junctions. Such junctions could have each chitin nanoparticles interacting with much more keratin chains. These junctions acted as bridging joints, improving the keratin entangling with each other. Therefore, the n values of keratin with chitin-5 and chitin-10 were lower than those of keratin without nanoparticles. According to statistical analysis, molecular entanglement of keratin chitin after addition of chitin-5 nanoparticles was significantly higher than that of pure keratin solution and, keratin with chitin-0 and chitin-2 nanoparticles. There was no significant difference in molecular entanglement between keratin with chitin-5 and chitin-10 nanoparticles. Statistical results indicated that a critical degree of chitin deacetylation existed to ensure the highest physical interactions between keratin and chitin nanoparticles. Increase in degree of entanglement in solution not only help formation of ordered protein structures but also improve the alignment of molecular chains. As a result, strength and flexibility of composites could be improved substantially.

TABLE 6

Rheological properties of keratin solution with and without chitin nanoparticles

| Solutions | K value (Pa · s$^n$) | n value |
|---|---|---|
| Keratin | $0.15 \pm 0.03^a$ | $0.28 \pm 0.01^A$ |
| Keratin with chitin-0 | $0.21 \pm 0.02^b$ | $0.34 \pm 0.01^B$ |
| Keratin with chitin-2 | $0.42 \pm 0.03^c$ | $0.28 \pm 0.02^A$ |
| Keratin with chitin-5 | $0.65 \pm 0.04^d$ | $0.24 \pm 0.01^C$ |
| Keratin with chitin-10 | $0.66 \pm 0.02^d$ | $0.24 \pm 0.01^C$ |

3 wt % of nanoparticles based on the weight of keratin were added. The larger K, the higher viscosity. Lower n, a higher degree of molecular entanglement. Data with the same letter indicate no statistically significant difference.

Figure 2:
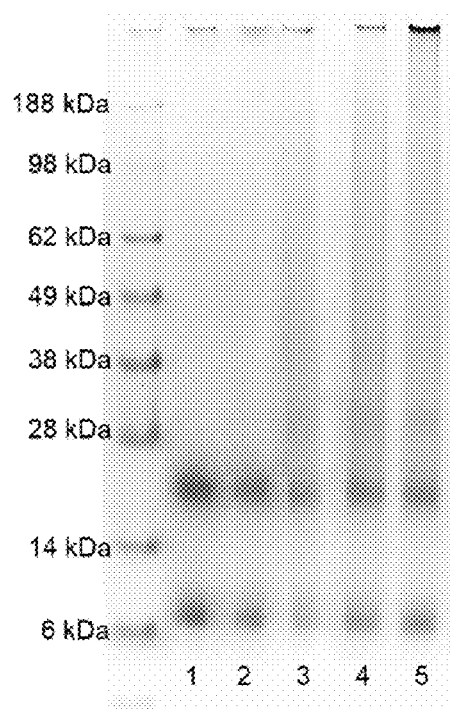
FIG. 2 is a reducing-SDS-PAGE of keratin-based composites. Lanes 1-5: keratin films, keratin films reinforced by chitin with degrees of deacetylation of 7%, 12%, 23% and 56%.

FIG. 2 shows the molecular weight of keratin after the addition of chitin and deacetylated chitin nanoparticles. Results show that crosslinking between nanoparticles and keratin occurred after chitin nanoparticles deacetylated to a considerable degree. When the degree of deacetylation was lower than 23%, it was difficult to form crosslinkages between nanoparticles and keratin molecules because of limited amino content and rigidity of nanoparticles. When the degree of deacetylation was higher than 23%, the number of crosslinkages increased as the increase in the degree of deacetylation of chitin nanoparticles. As shown in FIG. 1a, the shade higher than 28 kDa was darker when adding chitin nanoparticles with a higher degree of deacetylation. Meanwhile, the shade at 6 kDa and 20 kDa was lighter than that from keratin without nanoparticles, indicating the occurrence of crosslinking.

Figure 3:
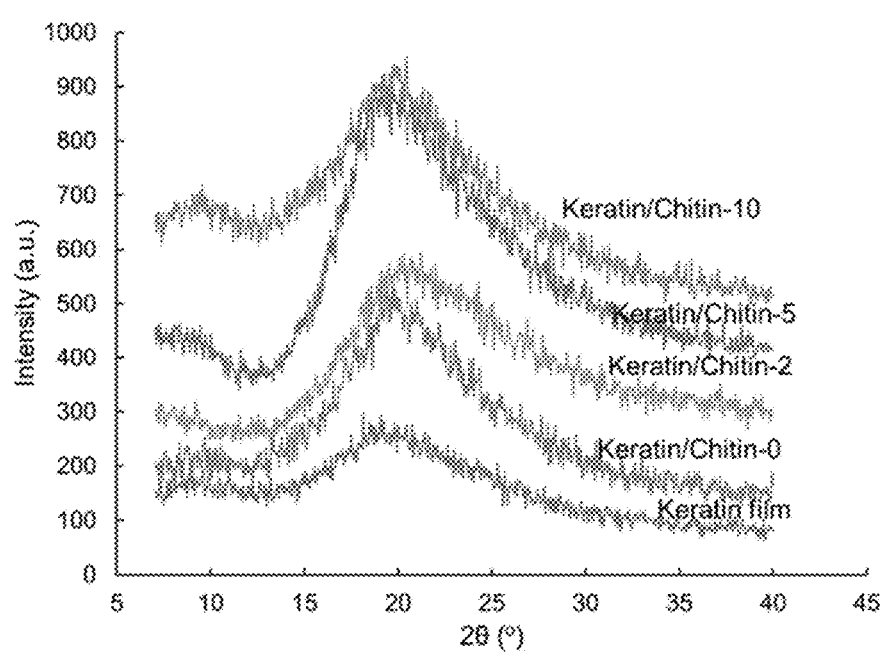
FIG. 3 shows secondary structures of keratin-based composites with deacetylated chitin nanoparticles.

FIG. 3 shows the XRD spectra of keratin films with and without the reinforcement of chitin nanoparticles. Results show that the addition of chitin nanoparticles with engineered deacetylation could substantially increase the degree of crystallinity of keratin-based composites. An increase in crystallinity resulted from the strong interactions between keratin and chitin. Without chitin reinforcement, the majority of molecular chains in films were randomly arranged, leading to limited interactions between keratin chains. Therefore, the formation of ordered structures in films was also limited. The degree of crystallinity of such a keratin film was only 22%. Since chitin nanoparticles would form kinds of physical crosslinkages among keratin molecules, such acicular nanoparticles could largely improve the interactions between keratin chains as well as help keratin molecules arranged in an ordered manner. Therefore, degrees of crystallinity of keratin-based composites increased to 25%, 28%, 37%, and 27% when adding nanoparticles of chitin-0, 2, 5, and 10, respectively. Given that increase in deacetylation of chitin would promote interactions of molecules in the composite, degrees of crystallinity of keratin films increased when degrees of deacetylation of chitin increased from 7% (chitin-0) to 23% (chitin-5). Nevertheless, a further increase in deacetylation would decrease the crystallized structures of composites, as the degree of crystallinity of chitin-10 reinforced keratin-based composites decreased from 37% to 27% compared to chitin-5 reinforced composites. One reason is that further deacetylation would improve the hydrophilicity of chitin nanoparticles, resulting in an increase in moisture content in composites. Such moisture acted as a plasticizer, decreasing the degree of crystallinity of composites. Though addition of 3% of nanoparticles based on the weight of keratin almost did not affect crystal peaks of keratin, degrees of crystallinity of keratin were calculated after subtraction of portion of nanoparticles.

Figure 4:
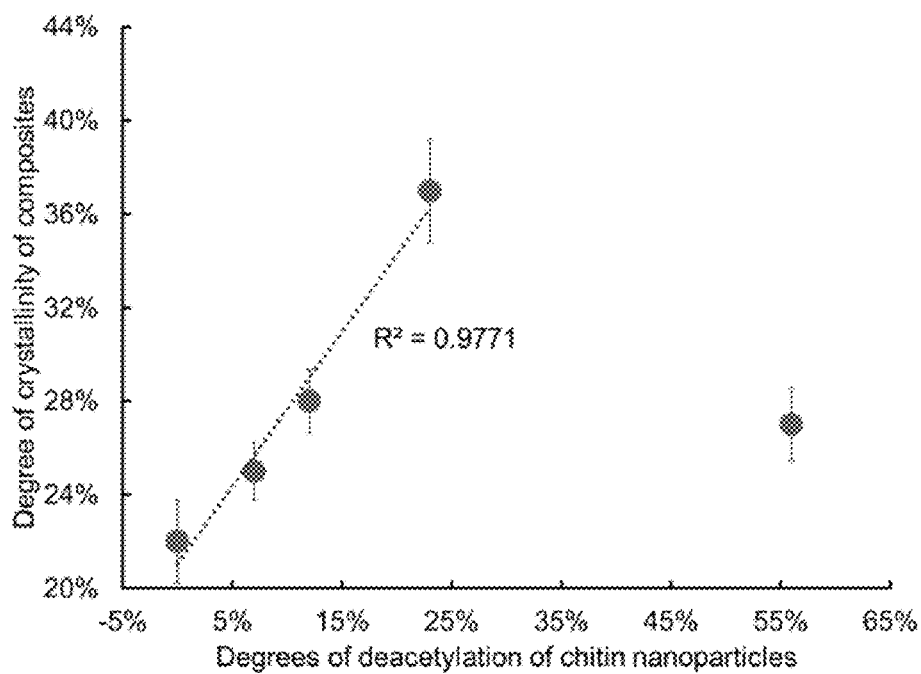
FIG. 4 is a plot of the relationship between the degree of crystallinity of composites and degree of deacetylation of chitin nanoparticles. 3 wt. % of nanoparticles based on the weight of keratin were added.

FIG. 4 shows the relationship between degree of crystallinity of composites and degree of deacetylation of chitin nanoparticles. Results show that when deacetylation of chitin was less than 30%, the degree of crystallinity of keratin-based composites increased linearly with the chitin deacetylation, demonstrating that the formation of ordered protein structures majorly resulted from the control of deacetylation of chitin nanoparticles. When further increasing the degree of deacetylation of chitin nanoparticles, such a linear relationship disappeared. The portion of ordered protein structures decreased. Further increasing the degree of deacetylation of chitin when such a degree was higher than 30%, the interfacial properties and interactions between protein and nanoparticles did not further improve. Nevertheless, further increasing deacetylation would increase the hydrophilicity of nanoparticles substantially, which introduced considerable moistures into composites. As a result, degrees of keratin crystallinity decreased because of the water molecules. Meanwhile, a further increase in deacetylation of chitin nanoparticles could still adjust the protein alignments in composites, which played an important role in flexibility of composites. The formation of ordered keratin structures and adjustable protein chain alignment can be dominated by engineered chitin deacetylation. Ordered keratin structures as well as molecular chain alignment largely determined the mechanical properties of composites.

Figure 5:
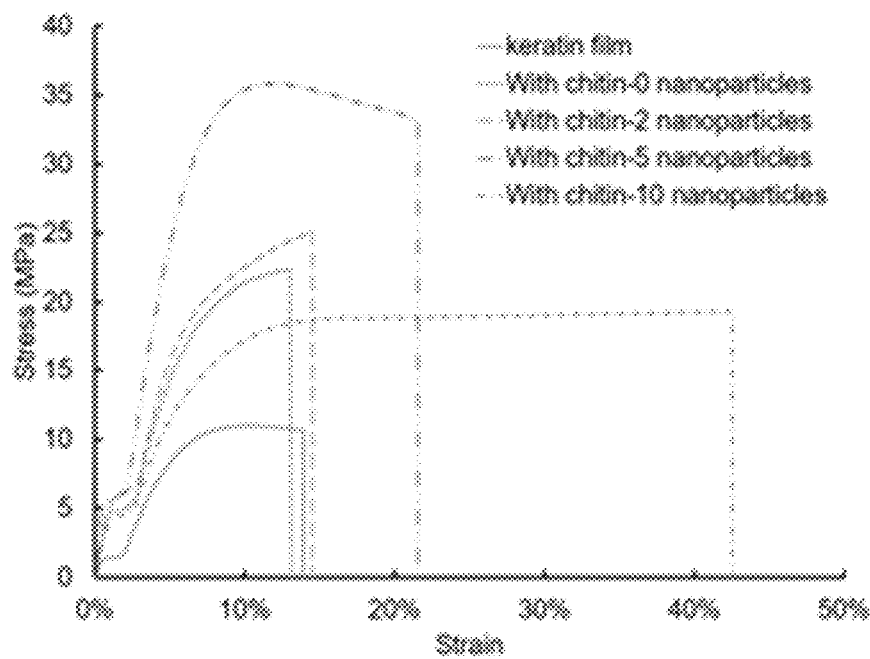
FIG. 5 shows stress-strain curves of keratin film with and without incorporation of chitin nanoparticles.
Figure 6:
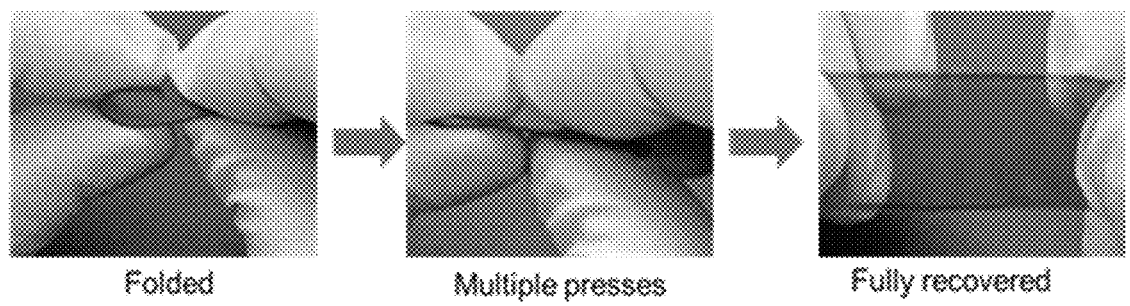
FIG. 6 shows the flexibility of keratin/chitin composites (with chitin-10 nanoparticles). 3 wt % of nanoparticles based on the weight of keratin were added.

FIG. 5 shows typical stress-strain curves of keratin and keratin/chitin composites. Results show that the addition of chitin nanoparticles substantially not only increased the breaking stress and toughness, but also the breaking strains of keratin films. Breaking stress increased by 209%, breaking strain increased by 205%, and toughness increased by 540%. The addition of chitin-5 nanoparticles provided the highest increase in breaking stress while the addition of chitin-10 nanoparticles provided the highest increase in breaking strain and toughness. Based on the results of Table 2 and FIG. 1a, nanoparticles formed some "physical crosslinkages" with keratin. Because of the high elastic modulus of chitin nanoparticles (45-65 Gpa), physical crosslinkages increase the breaking stress and modulus of keratin films substantially as wells as degrees of crystallinity. However, according to rheological data, as shown in Table 6, the entanglement of keratin molecules decreased after the addition of chitin-0 and chitin-2 nanoparticles, in which degrees of deacetylation were lower than 23%, indicating decreased interaction between protein molecules. Undesirable interaction led to poor alignment of protein chains. As a result, a limited increase in breaking strain as well crystal structures was observed for keratin-based composites. As the increase in degrees of deacetylation of chitin nanoparticles, new keratin-chitin junctions, and chemical crosslinkages formed. Such junction helps interaction between keratin molecules, facilitating the slippage between molecular chains in composites. As a result, breaking strains of keratin/chitin composites increased substantially. The breaking stress of keratin films with chitin-10 was lower than those with other chitin nanoparticles. The reason is as below. Further deacetylation increased the hydrophilicity of nanoparticles as well as the composites. Therefore, the moisture content of composites would increase as the degree of deacetylation of chitin nanoparticles increased. Water molecules acted as a plasticizer, resulting in a decrease in breaking stress and an increase in breaking strain of keratin/chitin composites. Toughness and flexibility of keratin-based composites are shown in FIG. 6. The figure shows that after multiple pressing on folded composites, such a composite was still strong and tough. The tough and flexible keratin-based composites meet the requirements for films in textile and agricultural applications, such as textile sizing and mulch.

Figure 7:
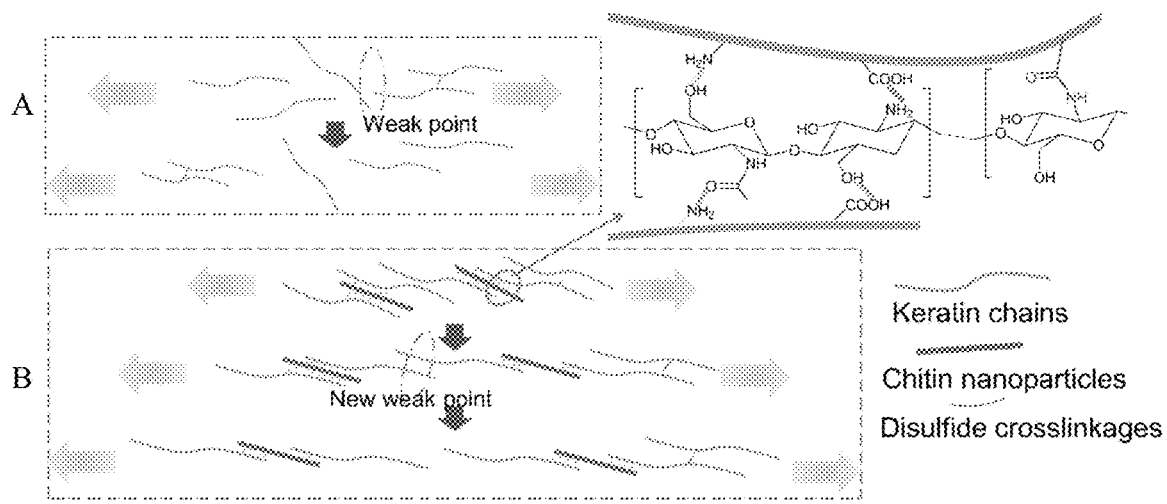
FIG. 7 shows schematics of forces exerted on keratin-based composites A) without the reinforcement of chitin nanoparticles, and B) with reinforcement of chitin nanoparticles with controlled deacetylation.

FIG. 7 shows the morphology of the molecular chain of the keratin films with and without the reinforcement of chitin nanoparticles subjected to an external force. Chitin nanoparticles with controlled deacetylation can significantly affect the mechanical properties of keratin materials. Interactions between intermolecular hydrogen bonds as well as disulfide crosslinkages dominated the mechanical properties of keratin-based films. Interactions between chitin nanoparticles and keratin affect the cleavages and restoration of intermolecular hydrogen bonds in keratin films. Weak points always exist in molecular chains of keratin materials. When external forces were applied to the films, the hydrogen bonds in such weak points were easily broken, leading to the eventual separation of molecular chains of materials. Keratin films also broke at this time, as shown in FIG. 7A. When molecular chains of keratin were reinforced by chitin nanoparticles, the hydrogen bonds in those weak points were strengthened by chitin nanoparticles since deacetylated chitin nanoparticles can form various interactions with keratin such as hydrogen bonding and chemical crosslinkages. As shown in FIG. 7B, when exerted external forces, hydrogen bonds in molecular weak points were not easily broken due to the reinforcement. In the meantime, backbones of keratin would be straightened to some extent under external forces due to the even distribution of stress. At this stage, the breaking stress of keratin/chitin composites substantially increased. As external forces increased, straightened molecular backbone chains slipped with each other until another weak point appears between molecular chains, resulting in a substantial increase in breaking strains.

Improvement of the Wet Properties of Keratin-Based Composites

Figure 8:
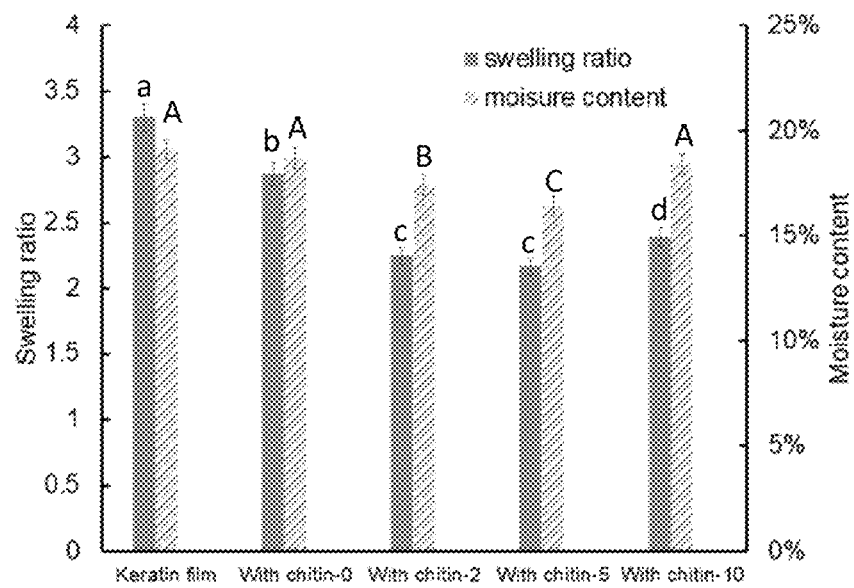
FIG. 8 shows changes of swelling ratios and moisture content of keratin film with chitin nanoparticles.

FIG. 8 shows the change in swelling ratios and moisture content of keratin films after the addition of chitin nanoparticles. Results show that nanoparticles decreased swelling ratio and moisture content of keratin film composites. Chitin-5 nanoparticles had keratin films with the lowest swelling ratios and moisture content, which were significantly different from films of pure keratin film and film with addition of Chitin-O. When degrees of deacetylation was low, the hydrophilicity of chitin nanoparticles was limited. Such particles can alter the surface properties of keratin after they were binding with each other. As a result, swelling ratio and moisture content of keratin films decreased from 3.4 and 19% to 2.2 and 17%, respectively. As the increase in the degree of deacetylation, chitin nanoparticles would form keratin-particle junctions and crosslinkages, consuming polar carboxyl groups on keratin. Therefore, the swelling ratio and moisture content continued to decrease. When deacetylation further increased, the hydrophilicity of chitin nanoparticles increased also. Meanwhile, further increase in chitin deacetylation would not further improve the interactions between keratin and nanoparticles. Therefore, with the incorporation of chitin-10 nanoparticles, the swelling ratio and moisture content of keratin films increased slightly also.

Figure 9:
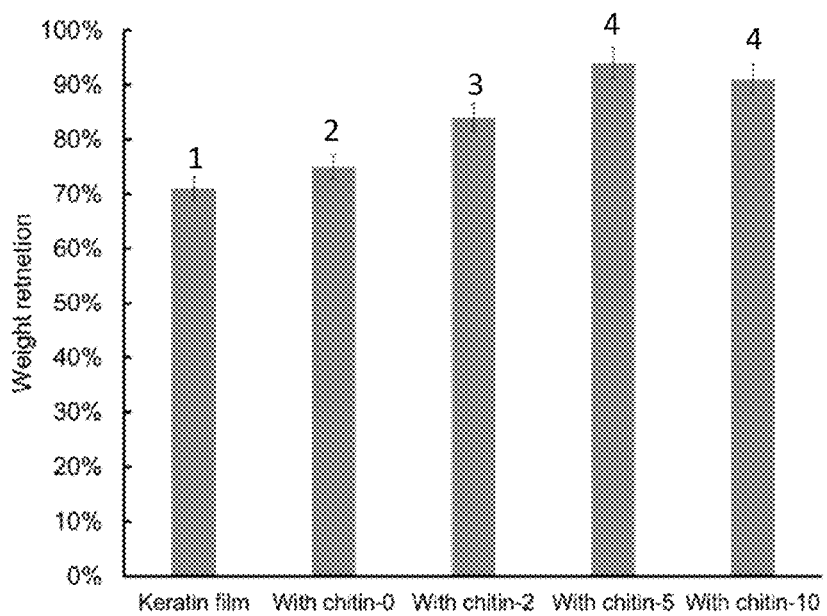
FIG. 9 shows weight retention of keratin film with and without chitin nanoparticles.

FIG. 9 shows the weight retention of keratin films before and after the addition of chitin nanoparticles. Results show that adding chitin nanoparticles with high degrees of deacetylation substantially increased the wet stability of keratin films. Without chitin nanoparticles, the weight retention of keratin films after immersed in water for one week was 71%. When adding chitin nanoparticles deacetylated for 5 hours endowed films with highest weight retention. There was a significant difference in weight retention between keratin with Chitin-5 and other composites except keratin with Chitin-10. Deacetylated chitin nanoparticles increased the wet stability of keratin films because nanoparticles formed strong interactions with keratin, including physical and chemical bonding. Therefore, the hydrophilicity of composites decreased. Weight retention of composites increased to 94%. Further deacetylation would increase the hydrophilicity of nanoparticles. As a result, the weight retention would slightly increase. According to statistical analysis, there was no significant difference in weight retention between keratin with Chitin-5 and keratin with Chitin-10. However, keratin with Chitin-10 had significant difference in weight retention from pure keratin film, keratin with Chitin-0 and keratin with Chitin-2.

Comparison of Mechanical Properties of Keratin Films with Different Treatments

Table 8 compares the mechanical properties of keratin films with different treatments. Results show that keratin/chitin composites had the highest breaking stress and very desirable breaking strains. Compared to cellulose, deacetylated chitin nanoparticles had a stronger affinity with protein, indicating better interfacial properties. As a result, the stress exerted can be better transmitted to matrix molecules around nanoparticles, so that a uniform force can be evenly distributed on the composites. The breaking stress and modulus increased. Though elastic modulus of cellulose nanoparticles was much higher than that of deacetylated chitin nanoparticles, stress cannot well distributed within the matrix. As a result, the property of cellulose nanoparticles cannot fully display in composites. The final breaking stress of keratin/cellulose composites was lower than that of keratin/chitin composites. Though adding plasticizers could ensure breaking strain of keratin films comparable to or higher than adding chitin nanoparticles, plasticizers deteriorated the mechanical strength of keratin seriously.

TABLE 8

Different treatments for reinforcement of keratin-based composites and films

| Treatment | Breaking stress (MPa) | Breaking strain |
|---|---|---|
| Incorporation of deacetylated chitin nanoparticles[1] | 20-35 | 20-40% |
| Incorporation of cysteine particles[2] | 7-20 | 25-60% |
| Crosslinked with sugar aldehydes[3] | 16-21 | 25-65% |
| Addition of glycerol[4] | 5-6 | 15-23% |
| Addition of sorbitol[5] | 0.5-5 | 16-50% |

[1]The present disclosure.
[2]X. Mi, H. Xu, Y. Yang, "Submicron amino acid particles reinforced 100% keratin biomedical films with enhanced wet properties via interfacial strengthening," Colloids and Surfaces B: Biointerfaces 177 (2019) 33-40.
[3]X. Mi, Y. Chang, H. Xu, Y. Yang, "Valorization of keratin from food wastes via crosslinking using non-toxic oligosaccharide derivatives," Food Chemistry, 300 (2019) 125181.
[4]G. R. P. Moore. S. M. Martelli, C. Gandolfo, P. J. do Amaral Sobral, J. B. Laurindo, "Influence of the glycerol concentration on some physical properties of feather keratin films," Food Hydrocolloids, 20(7) (2006) 975-982.
[5]S. M. Martelli, G. R. P. Moore, J. B. Laurindo, "Mechanical properties, water vapor permeability and water affinity of feather keratin films plasticized with sorbitol," Journal of Polymers and the Environment, 14(3) (2006) 215-222.

OTHER EMBODIMENTS

It is to be understood that while the compounds and methods have been described in conjunction with the detailed description thereof, the foregoing description is intended to illustrate and not limit the scope, which is defined by the scope of the appended claims. Other aspects, advantages, and modifications are within the scope of the following claims.

What is claimed is:

1. A method for preparing keratin-based composites, comprising:
    (i) mixing polysaccharide nanoparticles and a keratin solution to form a nanoparticle-keratin solution, wherein the polysaccharide nanoparticles are partially deacetylated chitin nanoparticles; and
    (ii) solvent casting the nanoparticle-keratin solution to form the keratin-based composites.

2. The method of claim 1, wherein the concentration of nanoparticles in the keratin is from about 1% to about 5%.

3. The method of claim 1, wherein the polysaccharide nanoparticles have an average particle size of about 50 nm to about 500 nm.

4. The method of claim 1, wherein the chitin nanoparticles have a degree of deacetylation about 5% to about 60%.

5. The method of claim 1, wherein the chitin nanoparticles are prepared by a process comprising:
    treating chitin with an acid to form an acid hydrolyzed chitin; and
    treating the acid hydrolyzed chitin with an alkali solution.

6. The method of claim 5, wherein the acid comprises hydrochloric acid, sulfuric acid, or a combination thereof.

7. The method of claim 5, wherein the alkali solution comprises sodium hydroxide, potassium hydroxide, or a combination thereof.

8. The method of claim 1, wherein the keratin solution has a concentration of from about 5% to about 15% keratin.

9. The method of claim 1, wherein the keratin solution is an aqueous solution.

10. The method of claim 1, wherein the keratin solution comprises a reducing agent.

11. The method of claim 10, wherein the reducing agent comprises one or more thiol groups.

12. The method of claim 11, wherein the reducing agent comprises mercaptoethanol, cysteine, dithiothreitol, 1,2-ethanedithiol, 1,3-benzenedithiol, bis(2-mercaptoethyl) ether, ethylene glycol bisthioglycolate, or a combination thereof.

13. The method of claim 1, wherein the keratin solution is prepared by a method comprising:
   extracting keratin from a keratinous material to form extracted keratin; and
   dissolving the extracted keratin in an aqueous solution comprising a reducing agent to form the keratin solution.

14. The method of claim 13, wherein the keratinous material comprises animal hair, horn, feather, or a combination thereof.

15. The method of claim 14, wherein the feather comprises a duck feather, a goose feather, a chicken feather, or a combination thereof.

16. The method of claim 14, wherein the animal hair comprises wool, camel hair, alpaca hair, rabbit hair, or a combination thereof.

17. The method of claim 13, wherein the pH of the aqueous solution is maintained between pH 8 and pH 10.

18. The method of claim 1, wherein an n value of keratin in the nanoparticle-keratin solution is identical to or higher than an n value of an analogous keratin solution without the nanoparticles.

19. The method of claim 1, further comprising heating the keratin-based composites.

20. The method of claim 19, wherein the composites are heated at a temperature of from about 45° C. to about 55° C. for a time of about 1.5 h to about 3 h.

21. The method of claim 1, wherein the thickness of the composites is from about 50 micrometers to about 200 micrometers.

22. The method of claim 1, wherein the composites are fibers having a diameter of about 15 micrometers.

23. The method of claim 1, wherein the composites comprise at least about 80% keratin.

24. The method of claim 1, wherein a degree of crystallinity of the composites is higher than a degree of crystallinity of analogous composites without the nanoparticles.

25. The method of claim 1, wherein a breaking stress of the composites is higher than a breaking stress of analogous composites without the nanoparticles.

26. The method of claim 1, wherein a breaking strain of the composites is higher than a breaking strain of analogous composites without the nanoparticles.

27. The method of claim 1, wherein the composites have a breaking stress of about 15 MPa to about 40 MPa.

28. The method of claim 1, wherein the composites have a breaking strain of about 15% to about 50%.

29. Keratin-based composites prepared by the method of claim 1.

30. The method of claim 1, wherein the keratin solution is prepared by a method comprising dissolving keratin in an aqueous solution; and
   the keratin solution has a concentration of about 5% to about 20% keratin.

31. The method of claim 19, wherein the heating forms amide crosslinkages between amino groups of the nanoparticle and carboxyl groups of the keratin.

32. The method of claim 1, wherein the partially deacetylated chitin nanoparticles are prepared by controlled deacetylation.

* * * * *